April 15, 1952 — A. G. PETERSON — 2,592,732
FRICTION SHOCK ABSORBING MECHANISMS FOR DRAFT RIGGINGS OF RAILWAY CARS
Filed May 15, 1950 — 2 SHEETS—SHEET 1

Inventor:
Arnold G. Peterson.
By Henry Fuchs
Atty.

April 15, 1952

A. G. PETERSON 2,592,732

FRICTION SHOCK ABSORBING MECHANISMS
FOR DRAFT RIGGINGS OF RAILWAY CARS

Filed May 15, 1950

2 SHEETS—SHEET 2

Inventor:
Arnold G. Peterson,
By Henry Fuchs
Atty.

Patented Apr. 15, 1952

2,592,732

UNITED STATES PATENT OFFICE 2,592,732

FRICTION SHOCK ABSORBING MECHANISMS FOR DRAFT RIGGINGS OF RAILWAY CARS

Arnold G. Peterson, Chicago, Ill., assignor to W. H. Miner, Inc., Chicago, Ill., a corporation of Delaware Application May 15, 1950, Serial No. 162,055

10 Claims. (Cl. 213—36)

This invention relates to improvements in friction shock absorbing mechanisms especially adapted for use in connection with draft riggings of railway cars.

One object of the invention is to provide a friction shock absorbing mechanism of the character indicated, having high shock absorbing capacity, wherein initial relatively soft action is provided by compression of an auxiliary friction means, and final heavier action is provided by compression of the main friction means together with further compression of the auxiliary friction means.

A more specific object of the invention is to provide a mechanism as set forth in the preceding paragraph, wherein the main friction means comprises a friction casing, spring resisted friction shoes slidable within the casing, a wedge member in wedging engagement with the shoes, and wherein the auxiliary friction means comprises a second friction casing disposed within the first named casing, spring resisted friction shoes slidingly telescoped within said second named casing, and a second wedge member in wedging engagement with the second named shoes, said second named casing, and a second wedge member in wedging engagement with the second named shoes, said second named wedge member extending through the first named wedge member and projecting outwardly beyond the same to receive the initial actuating force, and movable inwardly with respect to said first named wedge to an extent to allow the actuating force to be delivered simultaneously to both of said wedge members during the remainder of the compression stroke of the mechanism and thus actuate said main and auxiliary friction means in unison during final compression of the mechanism.

Other objects of the invention will more clearly appear from the description and claims hereinafter following.

Figure 1:
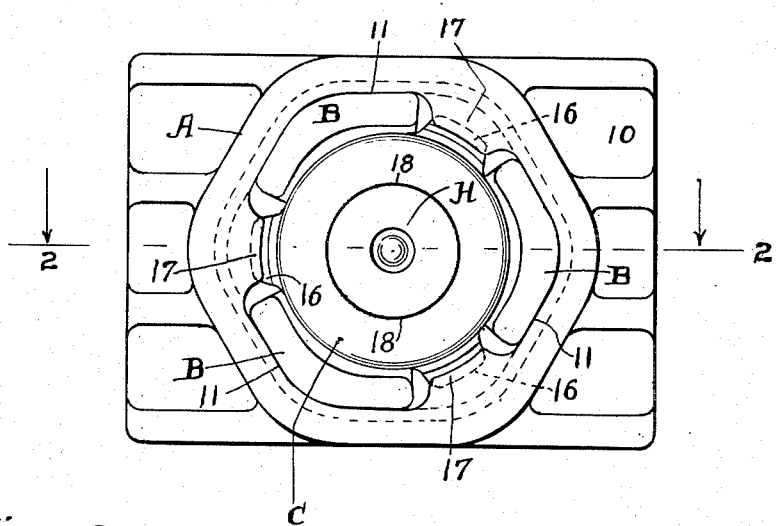
Figure 2:
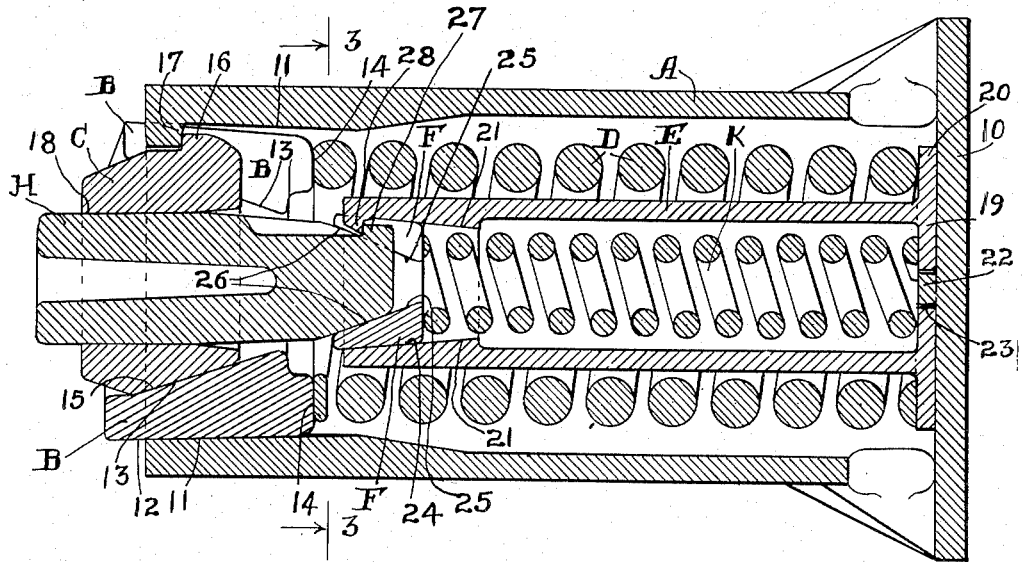
Figure 3:
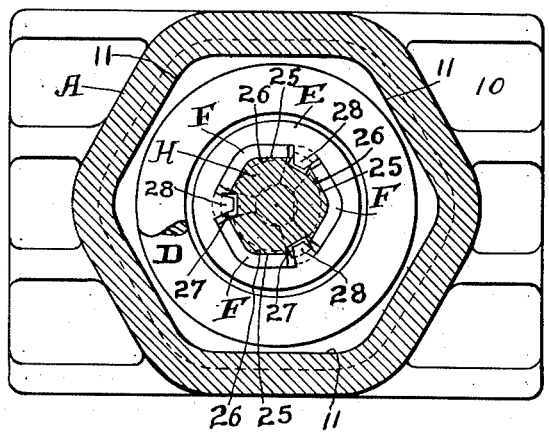
Figure 4:
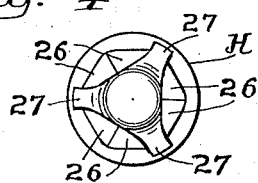
Figure 5:
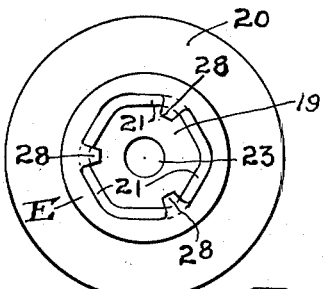
Figure 6:
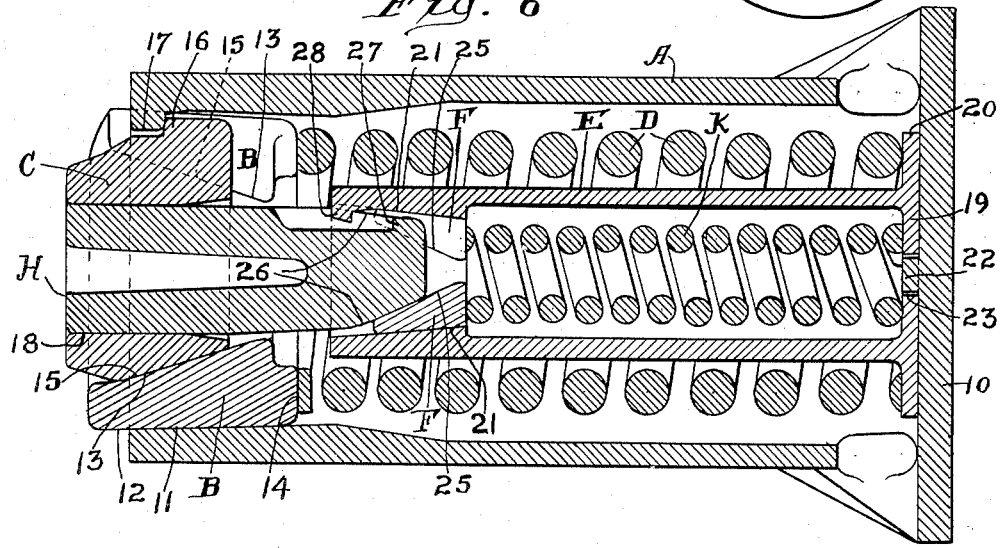

In the accompanying drawings forming a part of this specification, Figure 1 is a front elevational view of my improved friction shock absorbing mechanism. Figure 2 is a horizontal sectional view, corresponding substantially to the line 2—2 of Figure 1. Figure 3 is a transverse, vertical sectional view, corresponding substantially to the line 3—3 of Figure 2. Figure 4 is an end elevational view of the auxiliary wedge member shown in Figure 2, looking from right to left in said figure. Figure 5 is an end elevational view of the inner friction casing, looking from left to right in Figure 2. Figure 6 is a view similar to Figure 2, showing the mechanism partly compressed.

As illustrated in said drawings, my improved friction shock absorbing mechanism comprises broadly a main friction casing A, a set of three friction shoes B—B—B in sliding engagement with the casing A, a main wedge C in wedging engagement with the shoes B—B—B, a main spring resistance D, an auxiliary or inner friction casing E, a second set of three friction shoes F—F—F in sliding engagement with the casing E, an auxiliary wedge H in wedging engagement with the three shoes F—F—F, and a spring K within the casing E, yieldingly opposing inward movement of the shoes F—F—F.

The casing A is in the form of a tubular member of hexagonal, transverse cross section, open at its front end, as seen in Figure 2, and having a transverse wall 10 closing the rear end of the same. The wall 10 is extended outwardly beyond the casing at opposite sides thereof to provide an integral rear follower member, which is adapted to cooperate, in a well-known manner, with the usual rear stops of a railway draft rigging. At the open end thereof, the casing A is provided with three interior, inwardly converging friction surfaces 11—11—11 of V-shaped, transverse cross section.

The friction shoes B—B—B are slidingly telescoped within the casing A. Each shoe B has a friction surface 12 on its outer side of V-shaped, transverse cross section, engaged with one of the surfaces 11 of the casing. On its inner side, each shoe has a wedge face 13, preferably of V-shaped, transverse cross section. The rear end of each shoe B presents a flat, transverse abutment face 14 for the main spring D.

The wedge C is in the form of a block having three inwardly converging wedge faces 15—15—15 of V-shaped, transverse cross section, engaged with the V-shaped wedge faces 13—13—13 of the shoes B—B—B. The wedge C is further provided with three radially projecting stop lugs 16—16—16, alternated with the wedge faces 15—15—15 thereof, extending between adjacent shoes B—B, and engageable in back of three inturned stop lugs 17—17—17 on the casing A, to limit outward movement of said wedge C and thereby hold the mechanism assembled. The wedge C is formed with a central bore 18 adapted to accommodate the auxiliary wedge H for sliding movement lengthwise of the mechanism.

The friction casing E is disposed within the casing A and has a transverse wall 19 closing the rear end thereof, the wall 19 being extended laterally outwardly beyond the sides of the casing E to provide an annular abutment or follower flange 20 for the rear end of the spring D. As shown in Figures 2 and 3, the rear end of the casing E abuts the inner side of the wall 10 of the casing A, with the flange 20 buttressed against said wall. The casing E is preferably of cylindrical tubular form throughout the major portion of its length. At its front end, the casing E is of hexagonal, interior cross section and presents three interior friction surfaces 21—21—21, at said front end, which converge inwardly of the mechanism. Each friction surface 21 is of V-shaped, transverse cross section. The casing E is held centered by an inwardly projecting lug 22 on the wall 10 of the casing A, engaged in a central opening 23 in the wall 19 of said casing E.

The friction shoes F—F—F are slidingly telescoped within the casing E, each shoe having a V-shaped friction surface 24 on its outer side, slidingly engaged with one of the friction surfaces 21 of the casing E. On the inner side, each shoe F has a wedge face 25 on V-shaped, transverse cross section. The wedge faces 25—25—25 of the three shoes F—F—F converge inwardly of the mechanism.

The wedge H is in the form of an elongated column or bar of generally cylindrical cross section, slidable in the bore 18 of the wedge C. The wedge H has its outer or front end protruding beyond the outer or front end of the wedge C, as shown in Figure 2, and is provided with three inwardly or rearwardly converging wedge faces 26—26—26 at its rear end. The wedge faces 26—26—26 are of V-shaped, transverse cross section and engaged respectively with the wedge faces 25—25—25 of the shoes F—F—F. The wedge H is further provided with three radially projecting lugs 27—27—27 which extend between adjacent shoes F—F—F and are adapted to engage in back of inturned stop lugs 28—28—28 on the casing E to limit movement of said wedge outwardly of the casing.

The spring K is in the form of a helical coil, disposed within the casing E, and having its opposite ends bearing, respectively, on the inner ends of the shoes F—F—F and the end wall 19 of said casing.

The spring D is in the form of a helical coil, surrounding the casing E and having its front and rear ends bearing, respectively, on the inner ends of the shoes B—B—B and the follower flange 20 at the rear end of the casing E. As will be evident, the spring D holds the rear end of the casing E seated on the wall 10 of the casing A.

My improved friction shock absorbing mechanism, when employed in combination with railway draft riggings, is disposed within the usual yoke member of the draft rigging, with the front follower of the rigging bearing on the wedge H, and the integral rear follower of the casing A cooperating with the usual rear stop lugs of said rigging.

In the operation of my improved friction shock absorbing mechanism, upon compression of the same by relative movement toward each other of the front follower of the draft rigging and the casing A of the friction shock absorbing mechanism, the wedge H is forced inwardly of both the casing A and the casing E, the same sliding rearwardly within the wedge C until the front follower of the rigging and the wedge C come into engagement, whereupon the parts assume the position shown in Figure 6, and both wedges H and C are moved inwardly in unison until the mechanism is fully compressed and movement of the front follower of the rigging is arrested by engagement with the front end of the casing A.

During inward movement of the wedge H with respect to the wedge C, the shoes F—F—F are wedged apart and forced inwardly of the inner casing E along the friction surfaces 21—21—21, against the resistance of the spring K, thereby providing relatively light action during the first part of the compression stroke, that is, until the wedge C is engaged by the front follower of the rigging, and moved in unison with the wedge H. During movement in unison of the wedges H and C, compression of the friction shock absorbing means comprising the inner casing E, shoes F—F—F, wedge H, and spring K continues, and the wedge C is forced inwardly of the casing A, wedging the shoes B—B—B apart and sliding the same rearwardly on the friction surfaces 11—11—11 of the casing A, against the resistance of the spring D, thus providing additional high frictional resistance during the last part of the compression stroke of the mechanism to absorb the heavier shocks encountered in service.

I claim:

1. In a friction shock absorbing mechanism, the combination with a main shock absorber; of an auxiliary shock absorber, each of said shock absorbers comprising a wedge, friction shoes, a spring, and a friction casing containing said spring and within which said friction shoes are slidingly telescoped, said spring yieldingly opposing inward movement of said shoes, and said wedge being in wedging engagement with the shoes, the wedge of said auxiliary shock absorber projecting outwardly beyond the wedge of the main shock absorber to receive the actuating force during the entire compression stroke of the mechanism, and independently of the wedge of said main shock absorber, during the first part of the compression stroke.

2. In a friction shock absorbing mechanism, the combination with a main shock absorber; of an auxiliary shock absorber, each of said shock absorbers comprising a wedge, friction shoes, a spring, and a friction casing containing said spring and within which said friction shoes are slidingly telescoped, said spring yieldingly opposing inward movement of said shoes, and said wedge being in wedging engagement with the shoes, the wedge of said auxiliary shock absorber projecting outwardly beyond the wedge of the main shock absorber, a distance less than the full compression stroke of the mechanism, to receive the actuating force in advance of the wedge of the main shock absorber.

3. In a friction shock absorbing mechanism, the combination with a main shock absorber; of an auxiliary shock absorber, each of said shock absorbers comprising a wedge, friction shoes, a spring, and a friction casing containing said spring and within which said friction shoes are slidingly telescoped, said spring yieldingly opposing inward movement of said shoes, and said wedge being in wedging engagement with the shoes, the wedge of said auxiliary shock absorber extending through the wedge of the main shock absorber and projecting outwardly beyond the latter, a distance less than the full compression stroke of the mechanism, to receive the actuating force in advance of the wedge of the main shock absorber.

4. In a friction shock absorbing mechanism, the combination with an outer friction casing having interior friction surfaces; of an inner friction casing arranged within said outer casing, said inner casing having interior friction surfaces; friction shoes slidingly telescoped within said outer casing; friction shoes slidingly telescoped within said inner casing; a spring within said outer casing yieldingly opposing inward movement of said first named shoes; a spring within the inner casing yieldingly opposing inward movement of said second named shoes; a main wedge in wedging engagement with said first named shoes; and an auxiliary wedge in wedging engagement with said second named shoes, said auxiliary wedge projecting outwardly beyond said main wedge.

5. In a friction shock absorbing mechanism, the combination with an outer friction casing having interior friction surfaces; of an inner friction casing arranged within said outer casing, said inner casing having interior friction surfaces; friction shoes slidingly telescoped within said outer casing; friction shoes slidingly telescoped within said inner casing; a spring within said outer casing surrounding said inner casing and bearing on said first named shoes for yieldingly opposing inward movement of said first named shoes; a spring within the inner casing yieldingly opposing inward movement of said second named shoes; a main wedge in wedging engagement with said first named shoes; and an auxiliary wedge in wedging engagement with said second named shoes, said auxiliary wedge projecting outwardly beyond said main wedge.

6. In a friction shock absorbing mechanism, the combination with an outer friction casing having interior friction surfaces; of an inner friction casing arranged within said outer casing, said inner casing having interior friction surfaces; friction shoes slidingly telescoped within said outer casing; friction shoes slidingly telescoped within said inner casing; a spring within said outer casing yieldingly opposing inward movement of said first named shoes; a spring within the inner casing yieldingly opposing inward movement of said second named shoes; a main wedge in wedging engagement with said first named shoes, said main wedge having a central bore therethrough; and an auxiliary wedge in wedging engagement with said second named shoes, said auxiliary wedge extending through the bore of said main wedge and projecting outwardly beyond said main wedge.

7. In a friction shock absorbing mechanism, the combination with an outer friction casing having interior friction surfaces; of an inner friction casing arranged within said outer casing, said inner casing having interior friction surfaces; friction shoes slidingly telescoped within said outer casing; friction shoes slidingly telescoped within said inner casing; a spring within said outer casing yieldingly opposing inward movement of said first named shoes; a spring within the inner casing yieldingly opposing inward movement of said second named shoes; a main wedge in wedging engagement with said first named shoes, said main wedge projecting outwardly beyond said outer casing; and an auxiliary wedge in wedging engagement with said second named shoes, said auxiliary wedge projecting outwardly beyond said main wedge.

8. In a friction shock absorbing mechanism, the combination with an outer casing having a transverse rear end wall and interior friction surfaces at its front end; of an inner casing having an annular follower flange at its rear end bearing on the rear end wall of said outer casing, and interior friction surfaces at its front end; friction shoes slidingly telescoped within said outer casing; friction shoes slidingly telescoped within said inner casing; a spring within said outer casing having its opposite ends bearing on the first named shoes and the follower flange of said inner casing; a spring within the inner casing yieldingly opposing inward movement of said second named shoes; a main wedge in wedging engagement with said first named shoes; and an auxiliary wedge in wedging engagement with said second named shoes, said auxiliary wedge projecting outwardly beyond said main wedge.

9. In a friction shock absorbing mechanism, the combination with an outer casing having a transverse rear end wall and interior friction surfaces at its front end; of an inner casing an annular follower flange at its rear end bearing on the rear end wall of said outer casing, and interior friction surfaces at its front end; friction shoes slidingly telescoped within said outer casing; friction shoes slidingly telescoped within said inner casing; a spring within said outer casing having its opposite ends bearing on the first named shoes and the follower flange of said inner casing; a spring within the inner casing yieldingly opposing inward movement of said second named shoes; a main wedge in wedging engagement with said first named shoes, said main wedge having a central bore therethrough; and an auxiliary wedge in wedging engagement with said second named shoes, said auxiliary wedge extending through the bore of said main wedge and projecting outwardly beyond said main wedge.

10. In a friction shock absorbing mechanism, the combination with an outer casing having a transverse rear end wall and interior friction surfaces at its front end; of an inner casing having an annular follower flange at its rear end bearing on the rear end wall of said outer casing, and interior friction surfaces at its front end; friction shoes slidingly telescoped within said outer casing; friction shoes slidingly telescoped within said inner casing; a spring within said outer casing having its opposite ends bearing on the first named shoes and the follower flange of said inner casing; a spring within the inner casing yieldingly opposing inward movement of said second named shoes; a main wedge in wedging engagement with said first named shoes, said main wedge projecting outwardly beyond said outer casing and an auxiliary wedge in wedging engagement with said second named shoes, said auxiliary wedge projecting outwardly beyond said main wedge.

ARNOLD G. PETERSON.

No references cited.